Nov. 17, 1931.    T. A. WARD    1,832,067
CLAMPING BAND DEVICE FOR POURING PIPE JOINTS
Filed Nov. 26, 1929    2 Sheets-Sheet 1
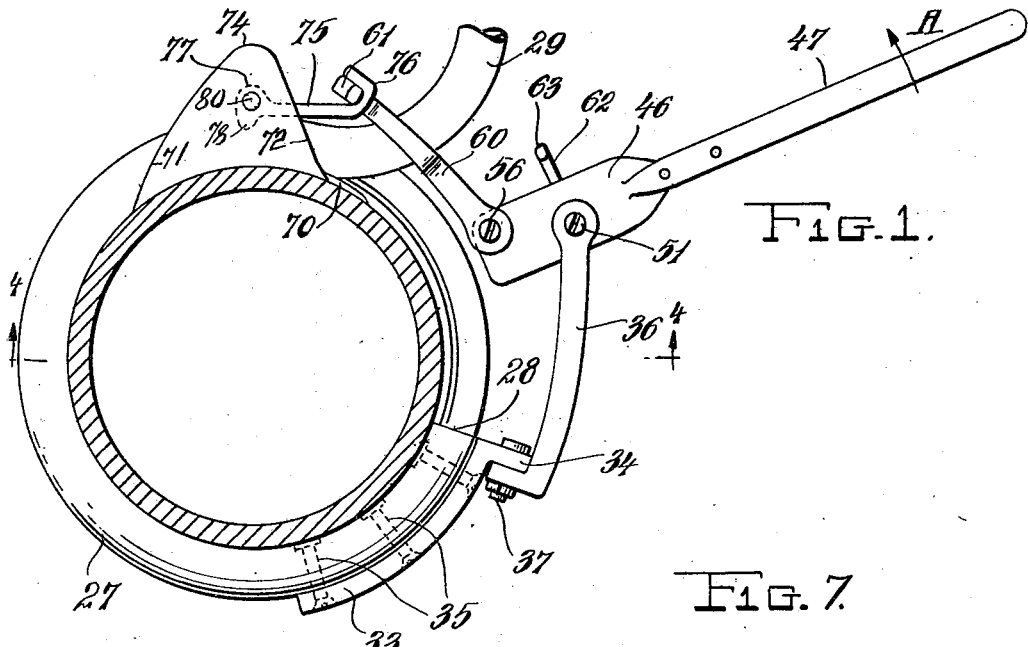
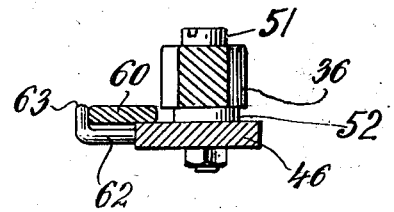
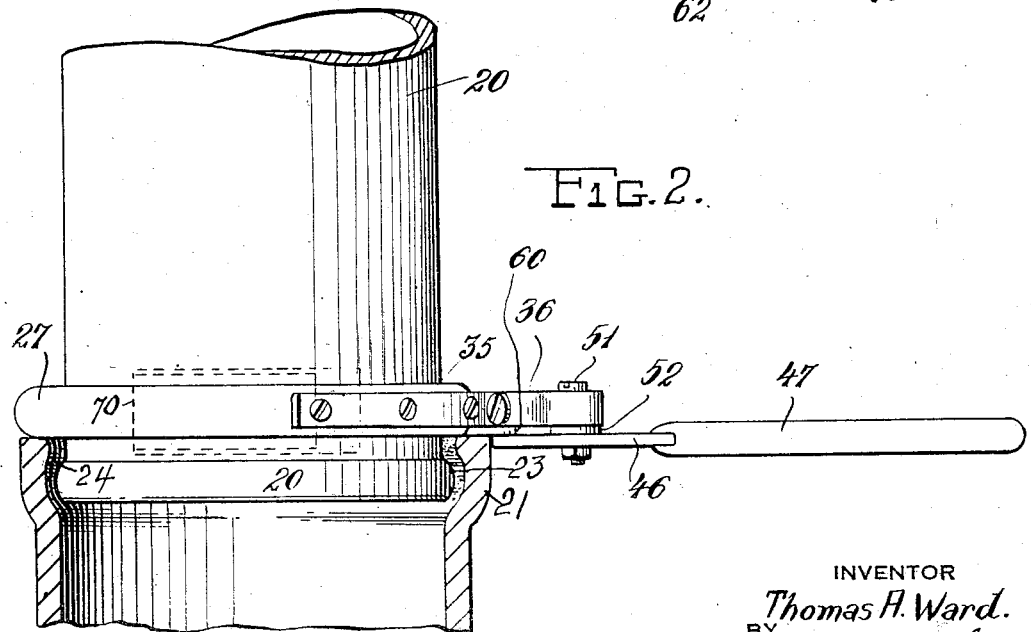
INVENTOR
Thomas A. Ward.
BY
A. A. de Bonneville
ATTORNEY

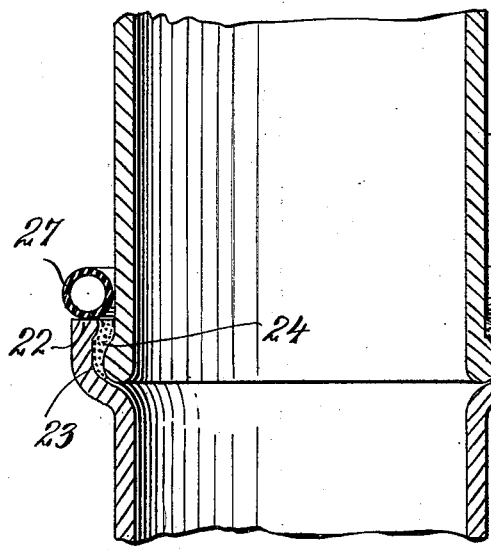
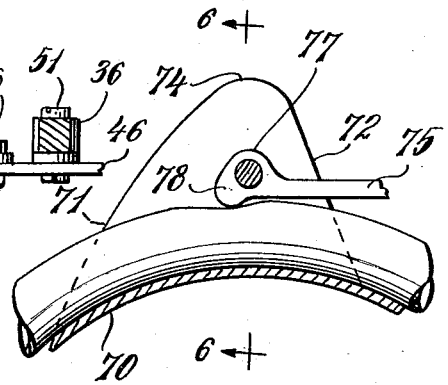
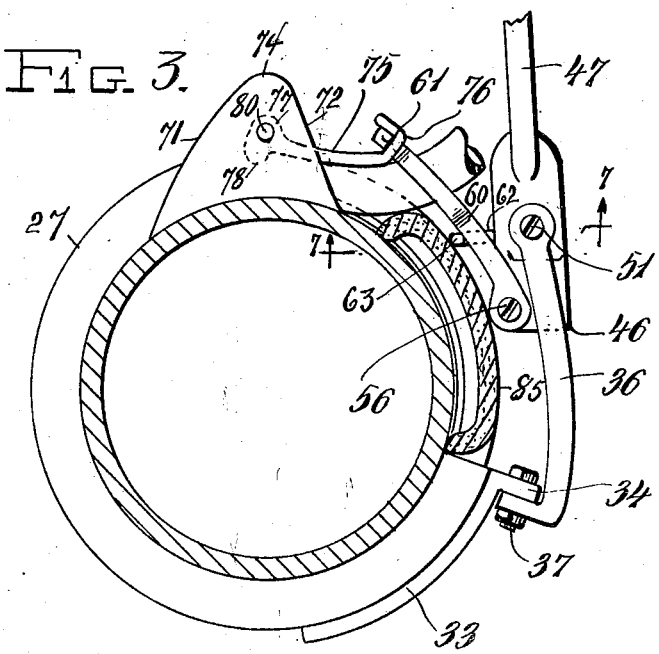
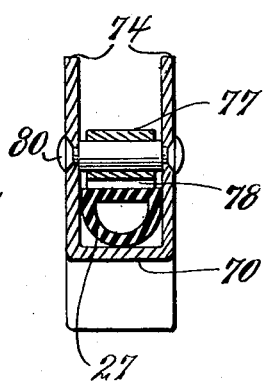

Patented Nov. 17, 1931

1,832,067

UNITED STATES PATENT OFFICE

THOMAS A. WARD, OF NORTH ARLINGTON, NEW JERSEY

CLAMPING BAND DEVICE FOR POURING PIPE JOINTS

Application filed November 26, 1929. Serial No. 409,984.

This invention relates to a clamping band device for pouring pipe joints.

The object of the invention is the production of a clamping band device for pouring the lead joints between the bell and spigot ends of pipes of different diameters. The second object of the invention is the production of a clamping band device in which the band thereof will tightly hug the pipe having the spigot end irrespective of any deformity therein, to avoid spilling the lead or other metal while it is being poured. The third object of the invention is the production of a clamping band device which can be easily operated and cheaply manufactured or repaired.

In the accompanying drawings Fig. 1 represents a top plan view of the improved clamping band device in its open position for pouring lead joints, with a pair of pipe ends; Fig. 2 shows a front view of Fig. 1 partly in vertical axial section; Fig. 3 is a view similar to Fig. 1 with the operating elements of the clamping band in their closed or locked position; Fig. 4 shows a section of Fig. 1 on the line 4, 4; Fig. 5 indicates an enlarged fragmentary portion of Fig. 1 partly in vertical section; Fig. 6 shows a section of Fig. 5 on the line 6, 6 and Fig. 7 shows an enlarged section of Fig. 3 on the line 7, 7.

The spigot end of a pipe is indicated at 20 and its accompanying bell end is shown at 21, with the upper face of the bell at 22. The usual annular channel 23 between the ends of the pipes is shown with the lead joint 24.

The clamping band per se is indicated at 27 and one end thereof is shown at 28, while its other end is indicated at 29. The said band 27 in this instance consists of a rubber hose having cloth or other fabric imbedded therein. The band may consist of various flexible materials, such as hemp rope and the like, and it is made long enough to be adaptable for pipes that vary greatly in diameter. Adjacent to the end 28 of the said band is positioned the bracket 33 having formed therewith the heel 34 at right angles thereto. The bracket 33 is fastened to the band 27 by means of the bolts 35. To the heel 34 is pivoted one end of the lever 36, by means of the screw pivot 37. An operating arm is indicated having the flat body portion 46 of metal and to which is fastened the handle 47 preferably of wood. A screw pivot 51 loosely connects the lever 36 to the flat body portion 46. A washer 52 encircles the pivot 51 and is positioned between the lever 36 and the flat body portion 46. The flat body portion 46 has loosely connected thereto, by means of the screw pivot 56 the gripping lever 60 having the hook end 61. A clamping hook 62 having the hook end 63 extends from the body portion 46 of the operating arm.

An adjustable clamping bracket is indicated with the annular base portion 70, from which extend the ears having the curved side edges 71, 72 with the crown 74. The edge 72 is closer than the edge 71, to a line passing through the axial center of the pipe ends and the crown 74.

An adjusting and hooking lever 75 is indicated having the hook 76 at one end and a journal hub 77 at its other end. A clamping projection 78 is formed with the journal hub 77. A hinge pin 80 connects the ears of the clamping bracket and the said journal hub 77.

To use the clamping band device the clamping bracket having the annular base portion 70 is approximately positioned on the band 27, to suit the diameter of the pipe ends operated upon. The band 27 is then encircled around the spigot end 20 and located upon the face 22 of the bell end 21, and the operating arm having the flat body portion 46 with its appurtenances is located in its unlocked position as indicated in Fig. 1. The hook ends 61 and 76 are then locked to each other as shown. The operator next swings the handle 47 in the direction of the arrow A to locate the operating arm in its locked position as shown in Fig. 3 which causes the projection 78 to tightly pinch the band 27 and a portion of said band is thereby tightly clamped around the spigot end 20. The hook end 63 of the clamping hook 62 is locked to the gripping lever 60 to lock the clamping band 27 with its appurtenances in operative position. The loose portion of the band 27 adjacent to its end 28 is swung away from the pipe ends 20 and 21, which the position of the edge 72 of the clamping bracket permits. A U shaped gate 85 is made of clay or other earth by forming a roll and shaping it as required. The gate 85 is located upon the face 22 of the bell end 21 as shown in Fig. 3 between the end 28 of the band 27 and the edge 72 of the ears of the clamping bracket. Next the molten metal is poured into the gate 85, which flows into the opening 23 between the ends of the pipes. Next the clamping band device is detached from the pipe ends by disengaging the hook 63 of the clamping hook 62 from the gripping lever 60. The operator then swings the handle 47 in a direction opposite to the arrow A, and the device can be easily detached from the pipes and the lead joint 24 can be tightly caulked in place.

It is to be noted that the band 27 is not injured by the molten metal, but charred slightly which makes it more effective for use.

Various modifications may be made in the invention and the present exemplification is to be taken as illustrative and not limitative thereof.

Having described my invention what I desire to secure by Letters Patent and claim is:

1. In a device of the character described the combination of a flexible band adapted to be positioned around a pipe operated upon, a clamping bracket adapted to bear against said pipe and clamp said band at a portion thereof, a second bracket spaced from the clamping bracket and fastened to one end of said band, a lever having one end pivoted to the second bracket, an adjusting and hooking lever having a hook at one end and a journal hub at its other end, a clamping projection extending from said journal hub adapted to pinch said band, a journal pin connecting said hub to said clamping bracket, an operating arm between said brackets, a gripping lever having a hook end with its other end pivoted to the operating arm, the hook end of the gripping lever adapted to lock with the hook of the adjusting and hooking lever, and means to lock the operating arm to the gripping lever when the band is tightly positioned around the pipe.

2. In a device of the character described, the combination of a flexible band adapted to be positioned around a pipe operated upon, a clamping bracket adapted to bear against said pipe and clamp said band, a second bracket spaced from the clamping bracket and fastened to one end of the band, a lever having one end pivoted to the second bracket, an adjusting and hooking lever having a hook at one end and its other end journaled to the clamping bracket, an operating arm located between the brackets, a gripping lever having a hook end, said gripping lever having its other end pivoted to the operating arm, the hook end of the gripping lever adapted to lock with the hook of the adjusting and hooking lever and a clamping hook having a hook end extending from the operating arm with its hook end adapted to be locked to the gripping lever.

3. In a device of the character described the combination of a flexible band adapted to be positioned around a pipe operated upon, a bracket fastened to one end of said band, an adjustable clamping bracket spaced from the first bracket and adapted to bear against said pipe and adjustably clamp said band at different portions thereof, an operating arm adapted to be swung to different positions, positioned between said brackets, connecting means between said arm and said brackets to tightly draw a portion of said band around said pipe when said operating arm is swung to its locked position and means to lock said operating arm in its locked position and also to unlock said arm.

Signed at Kearny in the county of Hudson and State of New Jersey this 28th day of October A. D. 1929.

THOMAS A. WARD.